INVENTOR.
Allen W. Hougland
BY
Evans & McCoy
ATTORNEYS

Oct. 10, 1950     A. W. HOUGLAND     2,525,098
BROACH
Filed Aug. 23, 1946     5 Sheets-Sheet 3
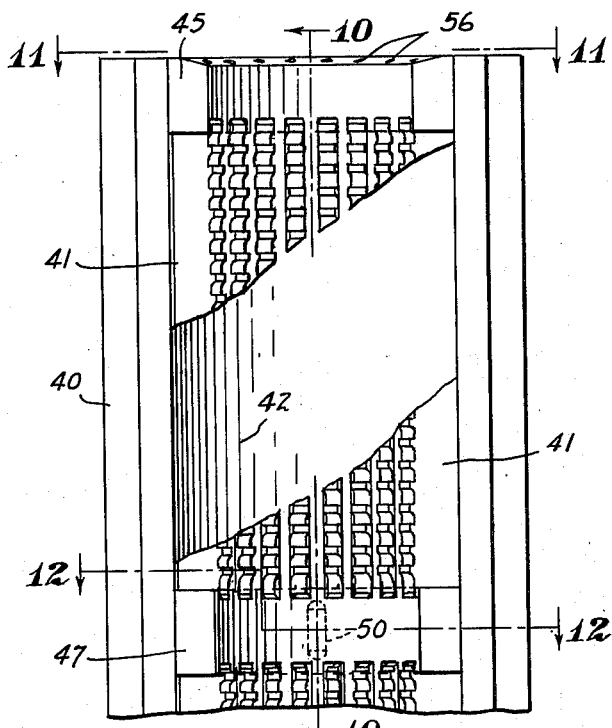
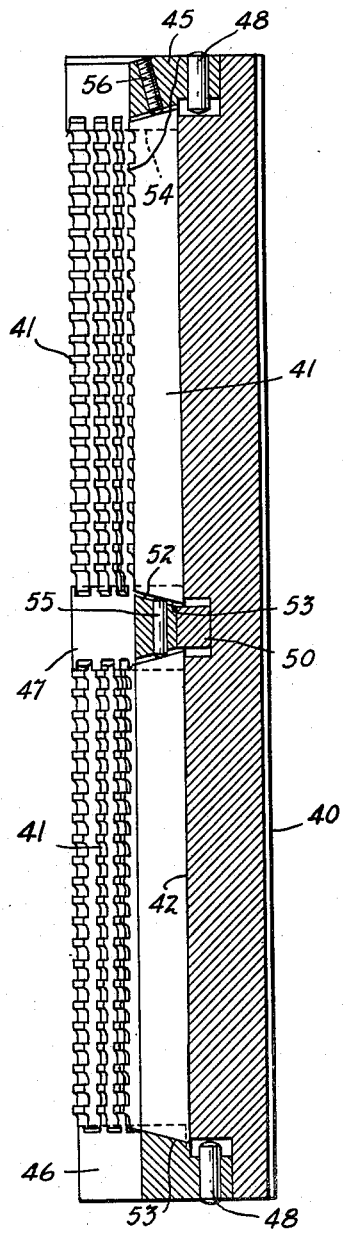
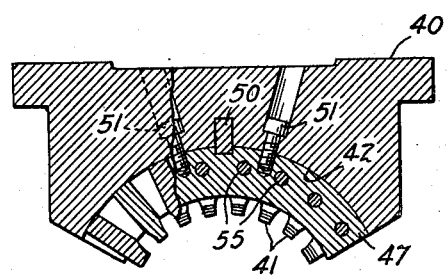
INVENTOR.
Allen W. Hougland
BY
Evans & McCoy
ATTORNEYS Oct. 10, 1950 — A. W. HOUGLAND — 2,525,098
BROACH
Filed Aug. 23, 1946 — 5 Sheets-Sheet 4
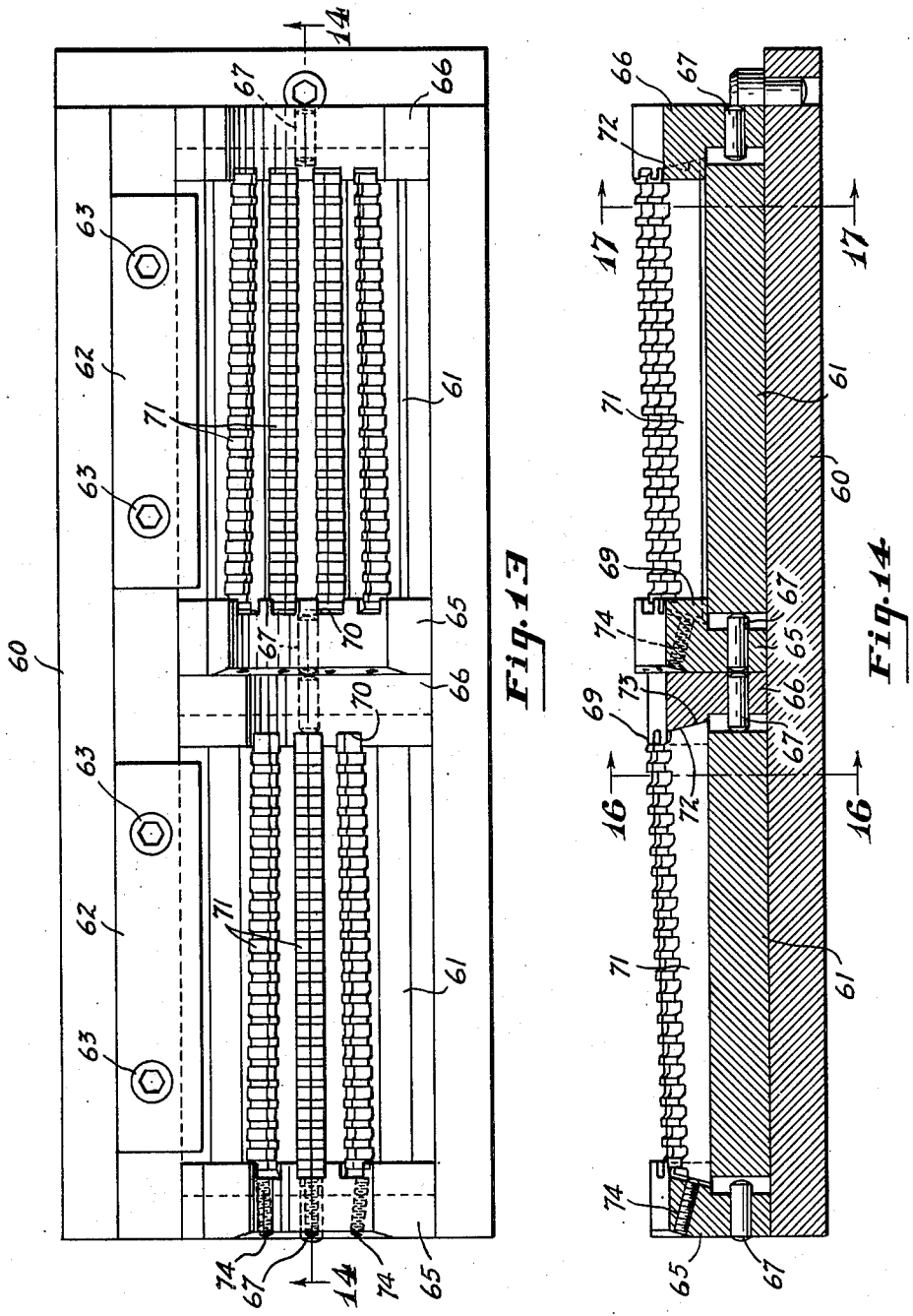
INVENTOR.
Allen W. Hougland
BY Evans + McCoy
ATTORNEYS

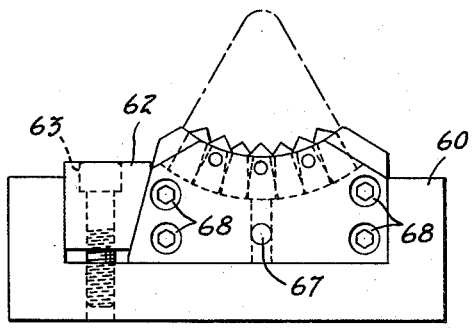
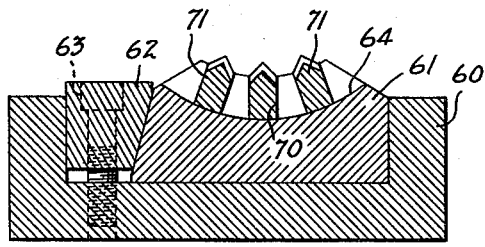
Fig. 15   Fig. 16
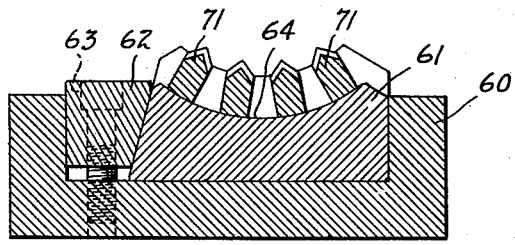
Fig. 17
INVENTOR.
Allen W. Hougland Patented Oct. 10, 1950

2,525,098

UNITED STATES PATENT OFFICE 2,525,098

BROACH

Allen W. Hougland, Detroit, Mich., assignor to Production Broaching Corporation, Wayne County, Mich., a corporation of Delaware Application August 23, 1946, Serial No. 692,547

11 Claims. (Cl. 90—33)

This invention relates to broaching machines and more particularly to a broach assembly for use in simultaneously cutting a series of parallel grooves in a work piece, as in splining a shaft or cutting the teeth of gears or gear segments.

The invention has for an object to provide a broach assembly comprising a series of elongated cutter bars that are rigidly backed and so clamped to their backing that ample space is provided between the bars for flow of liquid coolant and discharge of chips during the broaching operation.

A further object of the invention is to provide a mounting for the cutter bars in which each bar is clamped between retaining members at its ends which are provided with means for applying end thrusts to the bars in such manner as to press the bars tightly against the rigid backing.

An additional object of the invention is to provide a broach assembly which permits constant feed of a liquid coolant under pressure to the cutting teeth.

It is also an object of the invention to provide a broach assembly in which elongated cutter bars are mounted in a plurality of longitudinally spaced sets and in which endwise clamping pressure is transmitted from the bars of one set to the bars of the other.

A further object of the invention is to provide a broach assembly for the purposes specified that is composed of cutters of a simple form that are relatively inexpensive to manufacture and which can be readily resharpened when they are dulled by use.

An additional object of the invention is to provide a broach assembly for cutting closely spaced grooves composed of longitudinally spaced sets of elongated cutter bars so arranged that the bars of each set cut alternate grooves.

With the above and other objects in view, the invention may be said to comprise the broach assembly as illustrated in the accompanying drawings, hereinafter described and particularly set forth in the appended claims, together with such variations and modifications thereof as will be apparent to one skilled in the art to which the invention pertains.

Reference should be had to the accompanying drawings forming a part of this specification, in which:

Fig. 9 is a top plan view of a modified form of broach assembly in which the cutter bars are mounted on an arcuate backing face of cylindrical contour;

Fig. 10 is a longitudinal section taken on the line indicated at 10—10 in Fig. 9;

Fig. 11 is an end view taken as indicated at 11—11 in Fig. 9;

Fig. 12 is a transverse section taken on the broken line indicated at 12—12 in Fig. 9;

Fig. 13 is a plan view of another modified form of broach assembly;

Fig. 14 is a longitudinal section taken on the line indicated at 14—14 in Fig. 13;

Fig. 15 is an end elevation of the assembly shown in Fig. 13;

Fig. 16 is a section taken on the line indicated at 16—16 in Fig. 14, and

Fig. 17 is a section taken on the line indicated at 17—17 in Fig. 14.

Figure 1:
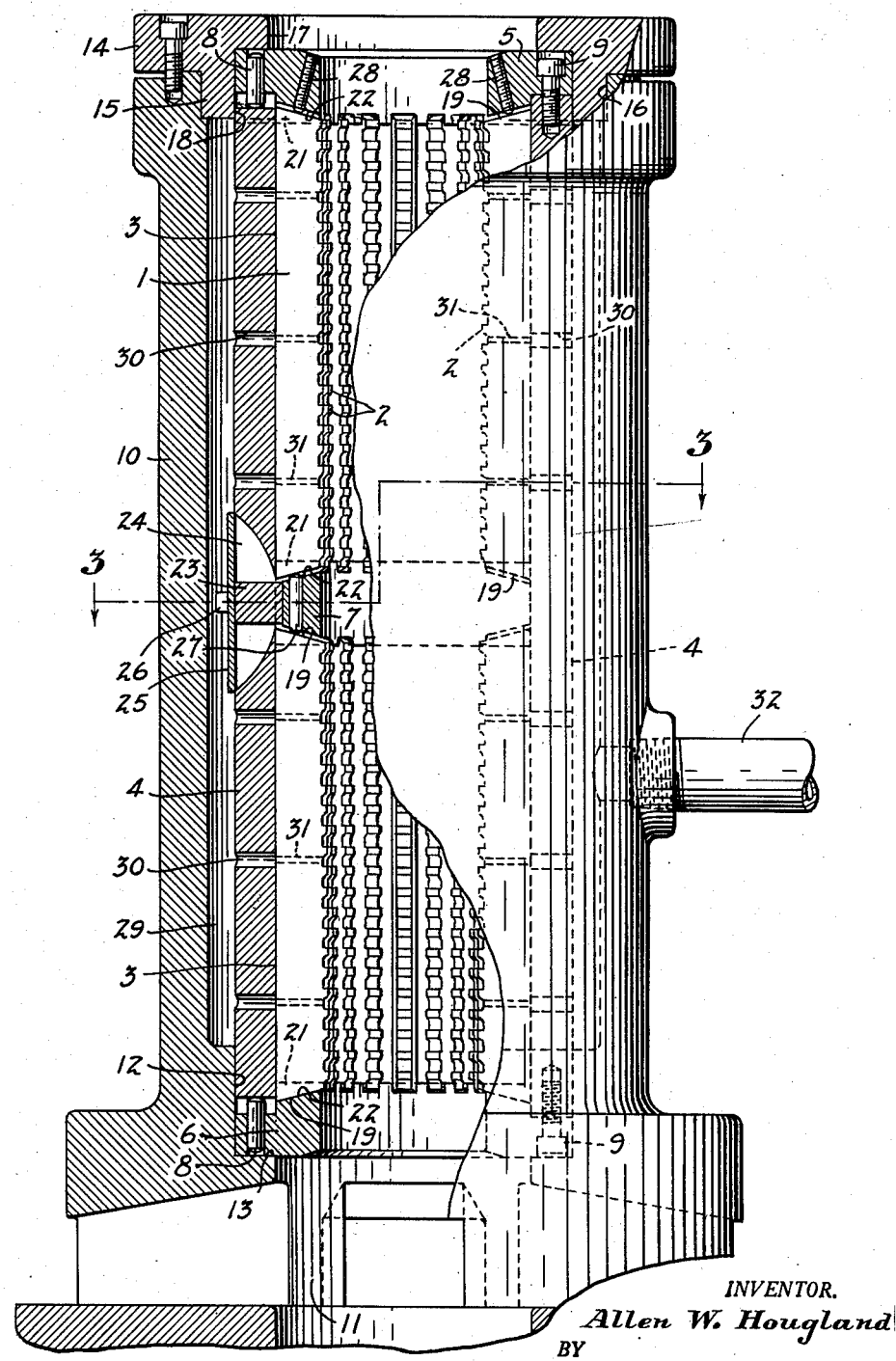
Figure 1 is a side elevation partly in section, showing a broach assembly embodying the invention.
Figure 2:
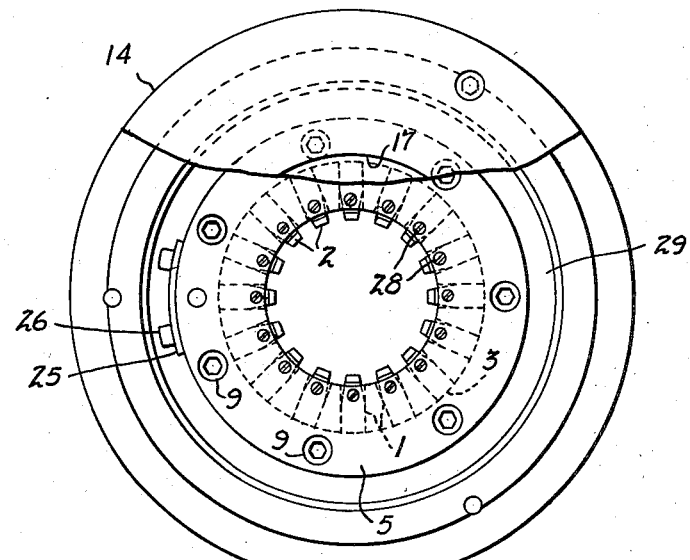
Fig. 2 is a top plan view of the assembly.
Figure 3:
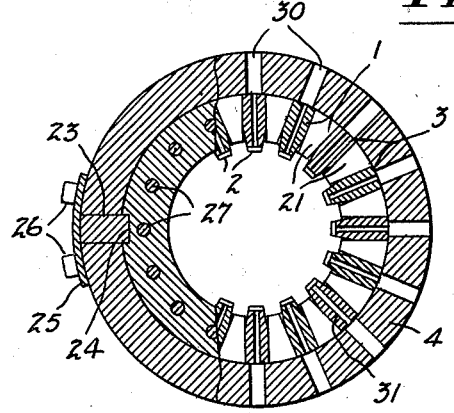
Fig. 3 is a horizontal section taken on the broken line indicated at 3—3 in Fig. 1.
Figure 4:
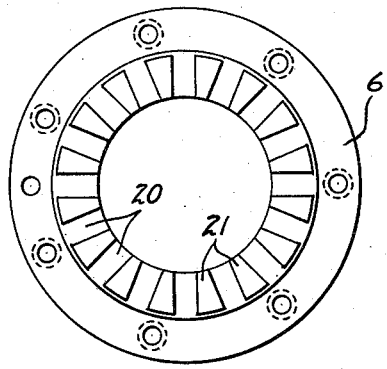
Fig. 4 is a plan view of one of the cutter bar retaining members.

Referring to Figs. 1 to 8 of the drawings, the cutters of the broach assembly are in the form of a series of identical elongated cutter bars 1 formed of flat stock. The bars 1 preferably have a slight longitudinal taper and are provided along one edge with cutting teeth 2. The edges 3 of the cutter bars 1 opposite that provided with cutting teeth are formed to conform to the interiorly cylindrical face of a tubular backing member 4 which is of a length to accommodate a plurality of sets of cutter bars arranged end to end. The cutter bars 1 are secured to the backing member 4 by means of end retaining members 5 and 6 of annular form and an intermediate annular retaining member 7, the retaining members 5 and 6 being secured to the opposite ends of the backing member 4 and the intermediate retaining member 7 being mounted within the tubular member 4 intermediate its ends. The end retaining members 5 and 6 are positioned by means of dowels 8 and fastened to the ends of the backing member 4 by means of bolts 9.

The tubular backing member 4 with its assembly of cutter bars is adapted to be mounted within a tubular supporting and housing member 10 that is provided with a central opening 11 in its base which is larger than the opening of the annular retaining members 5, 6 and 7. The supporting member 10 is provided with a counterbore 12 in the base thereof of a diameter to receive the lower end of the backing member 4, the bottom of the counterbore providing a flat annular seat 13 upon which the lower retaining member 6 is adapted to rest. At the top thereof the housing member 10 is provided with a cap 14 which has an annular flange 15 fitting in a counterbore 16 at the upper end of the housing, the cap 14 having a central opening 17 larger than the openings of the retaining members to permit insertion of the shaft or other work piece to be moved through the broach assembly. The cap 14 is suitably secured to the upper end of the housing and is provided with a counterbore 18 to receive the upper end of the backing member 4, the backing member 4 being clamped between the cap 14 and the seat 13 to immovably support it in the housing member 10.

Figure 6:
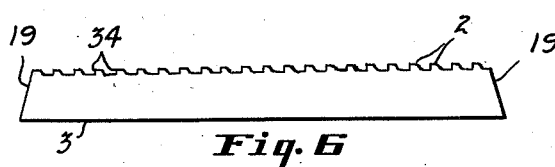
Fig. 6 is a side elevation of one of the cutter bars.
Figure 5:
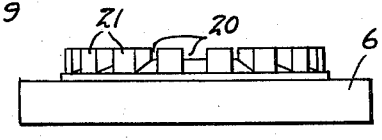
Fig. 5 is a side elevation of the retaining member shown in Fig. 4.

As shown in Figs. 1 and 6, the cutter bars 1 are provided with slanting ends 19 which taper from the base edge 3 to the edge in which the teeth 2 are formed. Each of the retaining members 5, 6 and 7 is provided with regularly spaced radially disposed channels 20 in which the ends of the cutter bars fit, the channels 20 being separated by sector shaped spacing flanges 21 and the bottoms of the channels being provided with undercut slanting faces 22 which conform to the slanting ends 19 of the cutter bars. The intermediate retaining member 7 has a sliding fit within the tubular backing member 4 and is positioned and held against angular movements therein by means of a key 23 mounted in a radial slot 24 formed in the cylindrical backing member 4. The key 23 is held in place by means of a retaining plate 25 secured to the exterior of the backing member 4 by means of bolts 26 and covering the slot 24.

The openings in the annular retaining members 5, 6 and 7 are of a diameter such that the teeth 2 of the cutter bars 1 project inwardly beyond the walls of the openings to cut a shaft or other work piece which is introduced through the openings of the retaining members. The cutter bar receiving channels in the opposite side faces of the intermediate spacer 7 are axially alined with one another and with corresponding channels in the end retaining members 5 and 6.

In assembling the cutter bars in the holder 4, the intermediate retaining member 7 may be placed in the holder and the lower set of cutter bars may be placed with their upper ends fitting in the channels of the retaining member. The lower retaining member 6 may then be placed in engagement with the lower ends of the cutter bars and the assembly moved upwardly to position the intermediate retaining member in engagement with the key 23 and at the same time engage the retaining member 6 with the lower end of the tubular member. The retaining member 6 may then be positioned by means of the dowel pin 8 and fastened in place by means of the bolts 9. The upper set of cutter bars may then be inserted into the backing member 4 into engagement with the channels in the upper face of the retaining member 7, after which the top retaining member may be engaged with the upper ends of the cutter bars and secured in place to the upper end of the backing member.

The intermediate retaining member 7 is provided with circumferentially spaced slidable axially extending thrust transmitting pins 27, each of the pins 27 having its ends disposed in axially alined channels formed in opposite faces of the retaining member. The pins 27 have rounded ends that engage the slanting faces 19 of longitudinally alined cutter bars and serve to transmit end thrust from one set of cutter bars to another.

The upper retaining members 5 are provided with clamping screws 28 which are disposed normal to the undercut retaining faces 22 of the retaining member and to the end faces 19 of the cutter bars, one clamping screw 28 being provided opposite the end of each cutter bar. When the screws 28 are adjusted downwardly they apply clamping pressure to the slanting ends 19 of the cutter bars and this pressure is transmitted from the upper set of bars to the lower set of bars by means of the slidable thrust pins 27 causing the lower ends of the lower set of cutter bars to be clamped against the retaining faces 22 of the lower retaining member 6. By reason of the sliding engagement of the clamping and thrust transmitting members with the slanting end faces of the cutter bars, the bars 1 will be subjected to a radial pressure as well as an endwise pressure to firmly hold them against the rigid backing member 4.

The housing and supporting member 10 is formed to provide an annular chamber 29 surrounding the tubular backing member 4 throughout the major portion of its length and the backing member 4 is provided with longitudinal rows of radial openings 30 which register with longitudinally spaced radially disposed passages formed in the cutter bars and opening to the toothed edges of the bars between teeth 2 thereof. A liquid coolant may be supplied under pressure to the chamber 29 through a pipe 32 and this liquid passes from the chamber 29, through the openings 30 and passages 31 to spaces between the teeth 2 on the inner edges of the cutter bars 1. Since the cutter bars 1 are clamped at their ends only a space is provided between the cutter bars for a considerable volume of cooling liquid which may be caused to flow rapidly along the work and through the broach assembly during a broaching operation to wash away chips and effectively cool the cutters and the work during the broaching operation.

Figure 7:
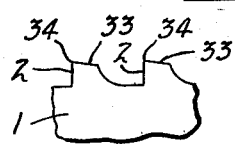
Fig. 7 is an enlarged fragmentary view in side elevation of a portion of the cutter bar.
Figure 8:
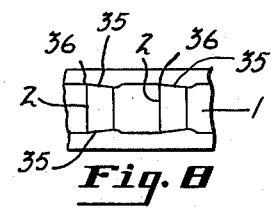
Fig. 8 is a top plan view of the enlarged portion of the cutter bar shown in Fig. 7 and illustrating a modified form of cutting tooth.

As shown in Fig. 7, each cutting tooth 2 is ordinarily provided with a slanting top face 33 which is disposed at an acute angle to the front face of the tooth to provide a cutting edge 34. For finishing cuts the teeth may be provided with relieved side faces 35 which provide acute angled cutting edges 36 along the sides of the teeth as shown in Fig. 8. The forming of the teeth 2 on the edges of the straight cutter bars is a simple machining operation and the sharpening of the teeth by grinding the faces thereof can be performed expeditiously with simple grinding machinery.

Where less than a complete circle of cutters is desired, an arcuate backing member may be provided as illustrated in Figs. 9 to 12 inclusive. In the modification shown in Figs. 9 to 12, a backing member 40 is provided which provides a support for a plurality of longitudinally spaced sets of cutter bars 41 which may be identical with the cutter bars previously described so that they will fit against an arcuate concave seating face 42 on the backing member 40 which is in the form of a segment of a cylinder. End retaining members 45 and 46 and an intermediate retaining member 47 are mounted on the backing member 40, the end retaining members 45 and 46 being positioned by dowels 48 and fastened to opposite ends of the backing member 40 by means of bolts 49. The intermediate retaining member 47 is positioned by means of a key 50 and fastened to the backing member 40 by means of radial bolts 51. The retaining members are provided with slanting undercut retaining faces 52 which conform to the slanting ends 53 of the cutter bars 41, the slanting faces 53 being the bottoms of spaced cutter bar receiving channels and between sector shaped positioning flanges 54 which serve to space the bars apart. The intermediate retaining members 47 carry thrust pins 55 that are interposed between longitudinally alined cutter bars similarly to the thrust pins 27 in the modification first described and the retaining member 45 is provided with clamping screws 56 for applying an end thrust to the cutter bars retained between the members 45 and 47. As in the modification first described, the cutter bars are clamped firmly against the backing member by the radial thrust resulting from the endwise pressure applied to the slanting end faces of the cutter bars. The blank to be cut may be moved longitudinally past the broach assembly, or the blank may be held stationary while the broach assembly is given an endwise movement.

In Figs. 13 to 17 of the drawings, a modified form of the invention is shown in which a plurality of sets of cutter bars are mounted with the bars of one set alined with the spaces between the bars of the other set so that the cutter bars of each set cut alternate grooves on the blank. In this modification a channel shaped supporting member 60 is provided in which a plurality of backing members 61 are rigidly secured by means of wedge blocks 62 interposed between one side of each backing member and a flange of the channel support, the wedge blocks 62 being held in place by bolts 63. Each backing member 61 has a concave arcuate face 64 of cylindrical form and retaining members 65 and 66 are fastened to opposite ends of each of the backing members. The retaining members are positioned by means of dowels 67 and fastened to the ends of the backing members by means of bolts 68. Each of the retaining members 65 and 66 has a flange 69 conforming to and overlying an end of a backing member 61. The edges of the flanges 69 are provided with channels 70 in which cutter bars 71 fit, the channels 70 having undercut bottom faces 72 that conform to slanting ends 73 of the cutter bars. Each retaining member 65 has a series of clamping screws 74, one positioned opposite the end of each of the cutter bars 71. The clamping screws 74 are normal to the slanting faces of the cutter bars and clamp the opposite slanting ends of the cutter bars against the inclined faces 72 of the retaining members 66. The cutter bars 71 are thus firmly held against the backing member 61 and held in properly spaced relation by means of the retaining and clamping members.

As shown in Fig. 13, the cutter bars of one set may be staggered with respect to the cutter bars of the adjacent set, so that the cutting edges of the bars of each set will cut alternate grooves in a work piece caused to pass along the length of the assembly.

As shown in Fig. 15, the cutting teeth may be formed to cut grooves which would be too close together to be cut by cutters mounted side by side.

It is to be understood that variations and modifications of the specific devices herein shown and described for purposes of illustration, may be made without departing from the spirit of the invention.

What I claim is:

1. A broach assembly comprising an elongated backing member, longitudinally spaced transversely disposed retaining members carried by said backing member, laterally spaced positioning channels in side faces of said retaining members, elongated laterally spaced cutter bars mounted longitudinally between said retaining members with their ends in said positioning channels, each of said cutter bars having a toothed outer edge and slanting end faces that converge from their inner edges toward said toothed edge, and independently movable members carried by said retaining members and slidably engaging the end faces of the cutter bars for independently applying an end thrust to the slanting end faces of the laterally spaced cutter bars to clamp the same between the retaining members and to press the said bars against the backing member.

2. A broach assembly comprising an elongated backing member, retaining members mounted in said backing member adjacent its ends, said retaining members having opposed slanting and undercut retaining faces, elongated cutter bars interposed between said retaining members and having slanting end faces that conform to the slanting retaining faces of the retaining members, means carried by the retaining members for holding said bars in spaced parallel relation, and screws carried by a retaining member and disposed perpendicular to the retaining face thereof for engagement with the ends of cutter bars to apply end thrust thereto.

3. A broach assembly comprising an elongated backing member, a transversely disposed retaining member fixed with respect to the backing member adjacent each of its ends, an intermediate transversely disposed retaining member fixed with respect to said backing member, an elongated cutter bar mounted between each end retaining member and said intermediate retaining member, said bars being longitudinally alined and spaced apart by said intermediate retaining member, a thrust transmitting member slidably mounted in said intermediate retaining member and interposed between said longitudinally alined cutter bars, and means carried by an end retaining member for applying end thrust to one of said cutter bars and through said slidable member to the alined cutter bar.

4. A broach assembly comprising an elongated backing member, retaining members carried by the backing member adjacent its ends, an intermediate retaining member, said end retaining members having inwardly facing undercut retaining faces and said intermediate retaining member having undercut retaining faces on opposite sides thereof, elongated tapering cutter bars having cutting teeth along their outer edges and having end faces inwardly of their toothed edges that conform to the undercut faces of said retaining members, means carried by said retaining members for holding cutter bars on opposite sides of an intermediate retaining member in longitudinal alinement, thrust transmitting pins slidably mounted in said intermediate retainers and disposed in alinement with and between alined cutter bars, and means carried by an end retaining member for applying an endwise pressure to the cutter bars.

5. A broach assembly comprising an elongated backing member, retaining members carried by the backing member adjacent its ends, an intermediate retaining member, said end retaining members having inwardly facing undercut retaining faces and said intermediate retaining member having undercut retaining faces on opposite sides thereof, elongated tapering cutter bars having cutting teeth along their outer edges and having end faces inwardly of their toothed edges that conform to the undercut faces of said retaining members, means carried by said retaining members for holding cutter bars on opposite sides of an intermediate retaining member in longitudinal alinement, thrust transmitting pins slidably mounted in said intermediate retainers and disposed in alinement with and between alined cutter bars, and screws mounted in an end retaining member and bearing against the ends of cutter bars for applying endwise pressure to the bars.

6. A broach assembly comprising an elongated backing member having a concave face of cylindrical form, a series of spaced retaining members carried by said backing member, said retaining members having slanting undercut retaining faces, elongated longitudinally tapering cutter bars having inner edges that conform to said concave face and outer toothed edges, said bars having end faces inwardly of their toothed edges that conform to said undercut retaining faces, means carried by said retaining members for holding said cutter bars against lateral movements, means carried by an end retaining member for applying an end thrust to each of the bars, and means carried by an intermediate retaining member for transmitting end thrust from each bar on one side thereof to a bar on the opposite side thereof.

7. A broach assembly comprising a tubular internally cylindrical backing member, a series of cutter bars formed of flat bar stock and having inner toothed edges and outer edges resting upon the cylindrical internal face of the backing member, spaced annular retainers having opposed faces provided with radially disposed channels in which opposite ends of said cutter bars are radially slidable, and means carried by one of said retainers for independently applying an end thrust and a radial outward thrust to each cutter bar received in its channels.

8. A broach assembly comprising an elongated internally cylindrical backing member provided with circumferentially spaced longitudinal rows of openings, a supporting member in the form of a housing formed to receive said backing member and providing a coolant receiving chamber around the portion of the backing member in which said openings are formed, and a series of cutter bars provided with cutting teeth along their inner edges and clamped against the cylindrical face of said backing member, said cutter bars having passages for coolant that register with the openings of the backing member and that extend from the outer edges of the bars to the toothed edges thereof.

9. A broach assembly comprising an elongated backing member having a transversely arcuate face of cylindrical contour, longitudinally spaced retaining members attached to said backing member and having channels radially disposed with respect to said arcuate face, longitudinally extending cutter bars having end portions fitting in said channels, each bar having one edge conforming to said arcuate surface and its opposite edge provided with cutting teeth, each of said bars having slanting end faces that converge toward their toothed edges, and clamping members carried by one of said retaining members and slidably engaging the slanting end faces of said bars, said members being adjustable to apply clamping pressure to the slanting end faces of the bars disposed in its channels to clamp the bars to the retainers and to press the bars against the backing member.

10. A broach assembly comprising an elongated backing member having a transversely arcuate face of cylindrical contour, longitudinally spaced retainers extending across the arcuate face of the backing member adjacent the ends and intermediate the ends thereof, said end and intermediate retaining members having opposed undercut retaining faces, longitudinal cutter bars, each having a toothed cutting edge and an edge opposite the cutting edge that conforms to the arcuate face of the backing member, each bar having end faces that conform to the opposed retaining faces of an end retaining member and said intermediate retaining member, means for detachably securing the retaining members to the backing member, means carried by the retaining members for spacing said cutter bars, means carried by the retaining member at one end of the backing member for applying an end thrust independently to each of said bars retained thereby, and means carried by the intermediate retaining member for transmitting end thrust so applied to the bars retained by the retaining member at the opposite end of said backing member.

11. A broach assembly comprising an elongated supporting member, two longitudinally spaced sets of elongated cutter bars carried by the supporting member, the bars of each set having parallel toothed cutting edges and the cutting edges of the cutter bars of each set being alined with the spaces between the cutter bars of the other set, and means for spacing said cutter bars and securing the same to said supporting member.

ALLEN W. HOUGLAND.

REFERENCES CITED

The following references are of record in the file of this patent:

UNITED STATES PATENTS

| Number | Name | Date |
|---|---|---|
| 1,909,840 | Muller | May 16, 1933 |
| 1,986,793 | Chapman et al. | Jan. 8, 1935 |

FOREIGN PATENTS

| Number | Country | Date |
|---|---|---|
| 419,276 | Great Britain | Nov. 8, 1934 |
| 463,730 | Great Britain | Apr. 5, 1931 |
| 541,158 | Great Britain | Nov. 14, 1941 |